United States Patent [19]

Woodruff

[11] Patent Number: 4,805,470

[45] Date of Patent: Feb. 21, 1989

[54] STARTER JAW BLOCKER

[75] Inventor: Frank Woodruff, New Hartford, N.Y.

[73] Assignee: Parker-Hannifin Corporation, Cleveland, Ohio

[21] Appl. No.: 845,093

[22] Filed: Mar. 27, 1986

[51] Int. Cl.[4] ........................ F02N 15/02; F16D 43/06

[52] U.S. Cl. ........................................ 74/7 C; 192/42; 192/94; 192/104 R

[58] Field of Search ...................... 74/7 C; 192/42, 46, 192/94, 104 R

[56] References Cited

U.S. PATENT DOCUMENTS

| | | | |
|---|---|---|---|
| 1,144,097 | 6/1915 | Bendix . | |
| 2,526,127 | 10/1950 | Gilbert | 74/7 C |
| 2,762,224 | 9/1956 | Hoefener | 74/7 C |
| 2,921,473 | 1/1960 | Fellows | 192/104 R X |
| 2,937,730 | 5/1960 | Quenneville | 192/104 X |
| 3,090,242 | 5/1963 | Sabatini | 192/104 R X |
| 3,319,755 | 5/1967 | Digby | 192/104 R |
| 3,458,019 | 7/1969 | Fant et al. | 192/42 |
| 3,915,020 | 10/1975 | Johnson | 192/104 R X |
| 4,114,746 | 9/1978 | Usui et al. | 192/104 R |
| 4,253,557 | 3/1981 | Bunger | 74/6 X |
| 4,355,917 | 10/1982 | Bunger | 403/24 |

*Primary Examiner*—Allan D. Herrmann

*Attorney, Agent, or Firm*—Christopher H. Morgan

[57] ABSTRACT

An engagement coupling for a starter drive, in which driving and driven jaws (20, 21) engage each other through face gears, is provided with a blocking mechanism (51). The blocking mechanism (51) is located in the driven jaw (21) and consists of flyweights (57) and a blocking rod (55). The flyweights (57) cause the rod (55) to extend into a blocking position against a pinion assembly (11) when a predetermined engine speed has been reached and the jaws (20, 21) have been separated. Once the rod (55) has been extended and the rotational speed of the driven jaw (21)is maintained, the rod (55) blocks the driving jaw (20) from destructively engaging the driven jaw (21). The blocking condition remains effective until such time as the driven (21) jaw has slowed down, e.g. after the engine has been shut down.

1 Claim, 2 Drawing Sheets

STARTER JAW BLOCKER

BACKGROUND OF THE INVENTION

This invention relates to rotory disconnect devices for disconnecting a rotation device once a predetermined rotational speed had been reached. In particular, the invention relates to engine starters having a coupling which advances into engagement with an engine by means of a helical spline arrangement. The invention has particular application to gas turbine engine starters such as air turbine starters used to start gas turbine engines.

The present invention has particular application to a starter coupling which advances into engagement with an engine by means of a helical spline arrangement. Such helical spline arrangements are well known in the art and are described in U.S. Pat. No. 1,144,097, to Vincent Bendix. Briefly, when starter begins to turn, a pinion gear moves longitudinally along helical splines on a starter shaft. When the engine is started, the starter is disengaged and caused to slow down, thereby allowing the pinion to return to its initial position on the starter shaft away from engagement with engine's driven gear.

In a typical application, gas air turbine starters are used on a multi-engine aircraft. Compressed air is provided to each of the aircraft's main engine starters, initally from an auxiliary power unit (APU) and then as bleed air from those main engines which have started. The pilot initiates his start procedure by powering up the APU, which typically uses an electric starter. He would then start number 2 engine, assuming that engine is closest to the APU. At a specified engine speed, the engine is ignited. At a higher speed, but below idle, the starter is disengaged while the engine is continued to be powered up to an idle speed. After number 2 has started, the would then start number 3, followed by numbers 1 and 4 after the number 3 starter is disengaged.

In starting an engine, the start speed is usually less the normal operating speed. It therefore is desirable to separate the starting motor from the main engine once the main engine has started. This is necessary to reduce power loss from the main engine, to prevent the starter motor from wearing due to extended periods of rotation at speeds above that for which the starter motor was designed and to reduce the wear due to ratcheting on the driving and driven jaws of those starter mechanisms equipped with overrunning clutches.

In the case of starters for a gas turbine engines, the engagement of the starter is by means of an overrunning clutch having mating jaws with axially extending, circumferentially-spaced teeth. The teeth on the mating jaws have ramped profiles so as to transmit torque in a driving direction but inhibit the transmission of torque in the reverse direction. This arrangement is shown in U.S. Pat. No. 3,458,091 to W. Fant, et al.

Since the spaced-apart relationship of the starter jaws is necessary when the starter motor is turned off after the main engine has been started, one logical approach is to maintain the spaced-apart relationship at all times when the starter motor is turned off.

When this type of mechanism is used in certain applications, particularly with propeller driven aircraft, vibration at some frequencies causes the starter's driving jaw to advance after engine start. When the starter is inactive, that jaw then comes into contact with the rotating engine half of the coupling (the driven jaw). In the case of air turbine starters, the untimely advance of the starter jaw may also be caused by air which may leak past the starter control valve, thereby causing the starter to improperly motor after the engine has been started. Regardless of the cause, untimely advance of the starter jaw can cause rapid wear and damage.

The aforementioned U.S. Pat. No. 3,458,019 discloses a centrifugal locking device which pivots against the splines in order to latch behind the splines after the starter has become engaged. This permits the driven jaw to be held in a favorable position as long as the locking device is latching against spline teeth.

It is therefore an object of the present invention to provide an improved lock-out arrangement for engine starter engagement couplings.

SUMMARY OF THE INVENTION

In accordance with the present invention, a rod is mounted within the driven jaw of a starter engagement mechanism. The rod is operated by a pair of flyweights balanced against a spring, so that when the flyweights exert a force on the rod which exceeds that of the spring, the rod is urged outward toward the driving jaw. The extension of the rod toward the driving jaw blocks the driven jaw from moving into engagement with the driving jaw once the driven jaw has reached a speed corresponding to engine operating speed. This prevents the starter's driving jaw from engaging the driven jaw while the engine is in operation, while permitting the starter to operate with a minimum of interference during engine start procedures.

DETAILED DESCRIPTION OF THE PREFERRED EMBODIMENT

Figure 1:
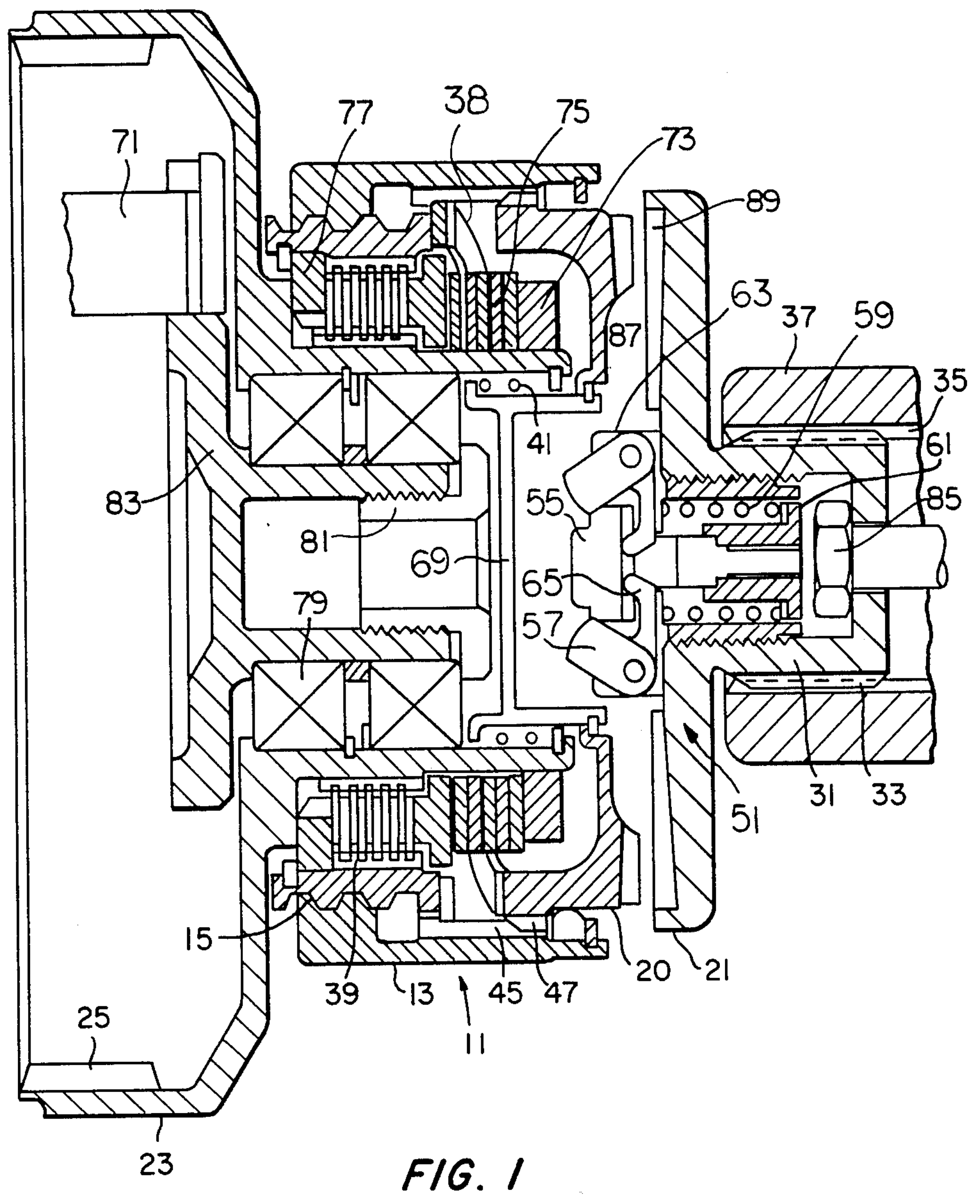
FIG. 1 is a side cross-sectional view of a starter coupling with a preferred embodiment of the inventive jaw blocker in a pre-start condition. The starter engages the coupling on the left side and a driven jaw, associated with the engine, is on the right side.

FIG. 1 shows a starter engagement mechanism 11, in which a starter drive assembly 13 rides along a helix gear arrangement 15. The starter engagement mechanism 11 causes a driving jaw 20 to move into engagement with a driven jaw 21. The driving and driven jaws 20, 21 are arranged as a mating pair of face gears.

The driving jaw 20 rotates with a starter output gear 23 which engages the starter's rotor (not shown) by means of gear teeth 25. The driven jaw 21 is fixed to a spline shaft 31 having splines 33 which engage mating splines 35 on a gear 37 within an engine gear box (not shown). During start up, the starter output gear 23 is caused to rotate by the starter. This causes the starter drive assembly 13 to advance the driving jaw 20 into engagement with the driven jaw 21, or as viewed in the drawings, to the right.

This longitudinal travel also permits the pinion assembly 13 to travel toward the driven jaw 21 to an extent which would otherwise exceed the ability of the driving and driven jaws 20, 21 to engage one another, thereby causing a spring 38 to become partially compressed and assuring firm engagement of the jaws 20, 21. This rotationally links the starter with the driven jaw 21, thereby transferring a positive torque to the engine through the engine gear box. Therefore, once the driving jaw 20 engages the driven jaw 21, a direct link is established between the starter and engine gear box, with the only positive rotational slippage possible being through a slip clutch 39 which prevents the engine from being overtorqued by the starter. After the engine has reached a pre-determined speed, ignition is commenced, further increasing engine speed. The starter is then de-energized by disconnecting the starter's power source such as pressurized air or electric power.

Disengagement then occurs when the speed of the driven jaw 21 exceeds that of the driving jaw 20 due to the ramp form of the teeth on the faces of the jaws 20, 21. The force of a spring 41 constantly urges the pinion assembly, and thereby the driving jaw 20, out of engagement or to the left as viewed in the drawing figures.

It is possible that the jaws 20 and 21 may momentarily be in partial engagement. During partial engagement, the driving jaw 20 is able to travel longitudinally with respect to the drive assembly 13, along splines 45, 47, against the biasing force of spring 38. This allows the jaws 20, 21 to ratchet against each other when the speed of the driven jaw 21 exceeds that of the driving jaw 20.

After engine start, the driven jaw 21 is rotating at a speed proportional to engine speed, while the rotational speed of the starter and the driving jaw 20 is insignificant. At this point, it is desirable that the driving and driven jaws 20, 21 do not engage one another.

Figure 2:
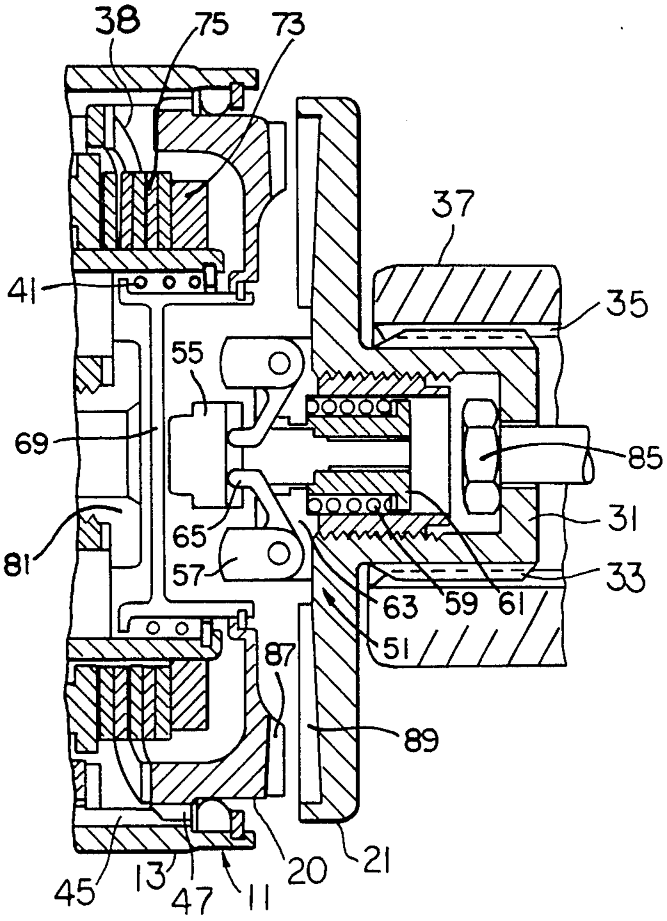
FIG. 2 shows the arrangement of FIG. 1 in a blocked condition which would occur after engine start.

FIG. 2 shows the condition of the starter engagement mechanism 11 after engine start, while the engine is running. As mentioned, it is desirable that the driving jaw 20 not engage the driven jaw 21 at this time. While such an engagement normally would not occur, there are several conditions which can cause such an engagement. In order to prevent this, a blocker assembly 51 is incorporated into the driven jaw 21.

The blocker assembly 51 includes a blocking rod 55 which is caused to move longitudinally by a pair of flyweights 57 acting against the force of a compression spring 59. The rod 55 is connected to a flanged nut 61 which abuts against the compression spring 59. The flyweights 57 are pivotably mounted to a flyweight body 63 which in turn is fixed to the driven jaw 21. The compression spring 59 abuts against the flyweight body 63, thereby urging the flanged nut 61 and rod 55 to move in the direction of the engine gear box 37, or to the right as viewed in the drawing figures. This is shown in FIG. 1. After the engine has reached a predetermined speed, the centrifugal force of the flyweights 57 is able to overcome the centripetal biasing force of the compression spring 59. If the driving jaw 20 is retracted out of engagement with the driven jaw 21, dogs (or arms) 65 extending from the flyweights 57 engage slots in the rod 55, causing the rod 55 to move in the direction of the starter attachment coupling 23, or to the left as shown in the drawing figures. This condition is shown in FIG. 2.

A center plate 69 is mounted to the driving jaw 20 so that the center plate 69 may be used as a mating surface to force the driving jaw 20 out of engagement with the driven jaw 21. In the preferred embodiment, the center plate 69 is slidably mounted to the driving jaw 20. As seen in the drawing figures, the plate 69 is mounted so that, when the plate 69 is forced to the left, or away from the driven jaw 21, the plate 69 forces the driving jaw 20 to the left, away from the driven jaw 21.

In the engine-running configuration shown in FIG. 2, if the starter drive assembly 13 tends to cause the driving jaw 20 to move toward engagement with the driven jaw 21, the center plate 69 engages the rod 55 before the jaws 20, 21 can engage. This condition persists until after the engine has slowed down to a speed sufficient for the flyweights 57 to be retracted by the compression spring 59, at which time the rod 55 retracts. Normally, the starter engagement mechanism 11 has returned to the condition shown in FIG. 1. It is this arrangement of the rod 55 and the center plate 69 which prevents destructive engagement of the driving and driven jaws 20, 21 which would be caused by untimely advance of the driving jaw 20.

Several pieces of the starter are well known to those skilled in the art and are not specially adapted in order to achieve the invention. One such part is the planet stud 71, which provides the axis about which one of the three planet gears (not shown) rotate the engage starter output gear 23. A clutch adjusting nut 73 is used to compress bellville washers 75 to develop an axial load across slip clutch 39 and establish the clutch slippage torque. A thrust plate 77 retains the compressed clutch discs of slip clutch 39. Output bearings 79 provide rotational support for the output gear 23 and the parts connected to it. A bearing retaining screw 81 holds the bearings 79 in place on a bearing shaft 83 upon which the bearings 79 are mounted.

A coupling retaining bolt 85 is used to fasten axially all of the elements which make up the driven jaw assembly. On the driving and driven jaws 20, 21 are face teeth 87, 89, respectively. These ramped teeth 87, 89 engage and disengage in the operation of the starter as described above.

The foregoing is intended to explain the invention by means of the preferred embodiment only, and it is clear to those skilled in the art that there are different ways of implementing the inventive features. It is therefore intended that the invention be read as limited only by the claims.

I claim:

1. An engagement mechanism for starting an aircraft engine or the like, comprising:

a rotatable drive assembly including a drive jaw and a center plate which, together, are axially movable between an engagement position and a disengagement position; and a rotatable driven assembly disposed for being rotatably driven by said rotatable drive assembly and including:

a driven jaw which engages said drive jaw when said drive jaw is said engagement position and which does not engage said drive jaw when said drive jaw is in said disengagement position;

a blocking rod disposed at the axis of said driven assembly and axially movable between a blocking position which blocks said center plate and, thereby, said drive jaw from moving to said engagement position, and a non-blocking position which does not block said center plate and said drive jaw from moving to said engagement position;

a spring urging said blocking rod to said non-blocking position;

a flyweight body rotating with said driven assembly and disposed about said blocking rod; and flyweights pivotably connected to said flyweight body, each of said flyweights having an arm which engages said blocking rod so that when flyweights are pivotably extended by rotation of the body said arms move said blocking rod against said spring to said blocking position, said flyweights being balanced so that when rotation of said flyweight body is greater than or equal to a predetermined speed, said flyweights overcome said spring to move said blocking rod to said blocking position.

* * * * *

UNITED STATES PATENT AND TRADEMARK OFFICE
CERTIFICATE OF CORRECTION

PATENT NO. : 4,805,470

DATED : February 21, 1989

INVENTOR(S) : Frank Woodruff

It is certified that error appears in the above—identified patent and that said Letters Patent is hereby corrected as shown below:

Claim 1, Line 52,add the word "in" after "said drive jaw is...".

Signed and Sealed this

Twenty-sixth Day of September, 1989

*Attest:*

DONALD J. QUIGG

*Attesting Officer*

*Commissioner of Patents and Trademarks*